United States Patent [19]

Brown

[11] Patent Number: 5,208,294
[45] Date of Patent: May 4, 1993

[54] HYDROGENATED NITRILE VULCANIZATES

[75] Inventor: Trevor A. Brown, Sarnia, Canada

[73] Assignee: Polysar Rubber Corporation, Sarnia, Canada

[21] Appl. No.: 718,179

[22] Filed: Jun. 20, 1991

[51] Int. Cl.$^5$ ............................................. C08F 8/42
[52] U.S. Cl. .................................... 525/263; 525/274
[58] Field of Search .............................. 525/263, 274

[56] References Cited

U.S. PATENT DOCUMENTS

| | | |
|---|---|---|
| 4,843,114 | 6/1989 | Touchet et al. . |
| 4,857,571 | 8/1989 | Reiter et al. . |
| 4,918,144 | 4/1990 | Fukuda . |
| 4,983,678 | 1/1991 | Saito et al. . |
| 4,990,570 | 2/1991 | Saito et al. . |

FOREIGN PATENT DOCUMENTS 319320A 7/1989 European Pat. Off. .

*Primary Examiner*—Bernard Lipman
*Attorney, Agent, or Firm*—Joseph C. Gil; Godfried R. Akorli

[57] ABSTRACT

Hydrogenated nitrile rubber based vulcanizates which have at least one of improved load bearing capabilities, improved abrasion resistance and reduced heat build-up are provided, the vulcanizates having been produced by vulcanization of a compound consisting essentially of 100 parts by weight of hydrogenated nitrile rubber, 10 to 85 parts by weight of zinc diacrylate and 1 to 10 parts by weight of an organic peroxide. Such vulcanizates are useful in belts, rolls and hoses.

7 Claims, No Drawings

HYDROGENATED NITRILE VULCANIZATES

BACKGROUND OF THE INVENTION

1. Field of the Invention

The present invention relates to vulcanizates of hydrogenated nitrile rubber having improved properties, especially one or more of improved load bearing capabilities, improved abrasion resistance and reduced heat build-up.

2. Description of the Prior Art

Published European Patent Application 319320A teaches rubber compositions which contain hydrogenated nitrile rubber and an unsaturated carboxylic metal salt—more specifically, the unsaturated carboxylic metal salt is a metal salt (magnesium, calcium, zinc and aluminum being preferred) of an unsaturated carboxylic acid having one or more carboxylic groups. Such unsaturated carboxylic acids include acrylic acid, methacrylic acid, maleic acid, fumaric acid, itaconic acid and the like. The amount of unsaturated carboxylic metal salt, per 100 parts by weight of the hydrogenated nitrile rubber, is from 1 to 100, preferably from 5 to 40, parts by weight.

U.S. Pat. No. 4,843,114 teaches compounds for tracked vehicle pads comprising 100 parts by weight of hydrogenated nitrile rubber, from 1.5 to 30 parts by weight of zinc oxide or magnesium oxide, from 25 to 50 parts by weight of zinc methylmethacrylate or zinc dimethylmethacrylate, a curative selected from dicumyl peroxide and sulfur or sulfur compounds, a filler and antidegradant systems.

U.S. Pat. No. 4,857,571 teaches that prevulcanization (i.e. scorch) of an elastomer is inhibited by using a formulation containing a free radical curable elastomer, a free radical source, a polyfunctional monomer coagent capable of reacting with the free radicals to crosslink the elastomer, and a vulcanization inhibitor selected from certain methyl-substituted-aminoalkyl phenols, in which the elastomer is selected from a long list of polymers which does not include hydrogenated nitrile rubber and in which the polyfunctional monomer coagent includes a long list of materials including zinc di-acrylate and zinc dimethacrylate.

U.S. Pat. No. 4,918,144 teaches a vulcanizable composition containing 100 parts by weight of hydrogenated nitrile rubber, 0.2 to 10 parts by weight of an organic peroxide and 5 to 90 parts by weight of zinc dimethacrylate.

U.S. Pat. No. 4,983,678 teaches a curable composition containing 100 parts by weight of a rubber mixture containing 60 to 90 weight per cent of a hydrogenated nitrile rubber and 10 to 40 weight per cent of an ethylene-propylene copolymer rubber, 10 to 100 parts by weight of the zinc salt of methacrylic acid and 0.2 to 10 parts by weight of an organic peroxide.

U.S. Pat. No. 4,990,570 teaches a curable composition containing 100 parts by weight of a hydrogenated nitrile rubber, 10 to 100 parts by weight of the zinc salt of methacrylic acid, 5 to 50 parts by weight of silicic anhydride and 0.2 to 10 parts by weight of an organic peroxide.

SUMMARY OF THE INVENTION

The present invention provides a hydrogenated nitrile rubber based vulcanizate having at least one of improved load bearing capabilities, improved abrasion resistance and reduced heat build-up, said vulcanizate having been produced by vulcanization of a compound consisting essentially of 100 parts by weight of hydrogenated nitrile rubber, 10 to 85 parts by weight of zinc di-acrylate and 1 to 10 parts by weight of an organic peroxide.

DESCRIPTION OF THE PREFERRED EMBODIMENTS

The hydrogenated nitrile rubber used in the present invention is a commercially available product manufactured by the hydrogenation of a major portion of the carbon-carbon double bond unsaturation in nitrile rubber. Nitrile rubber is a polymer comprising from about 50 to about 85 weight per cent of one or more $C_4$–$C_6$ conjugated diolefin and from about 15 to about 50 weight per cent of a $C_3$–$C_5$ $\alpha,\beta$-unsaturated nitrile. Nitrile rubber also includes polymers containing butadiene, acrylonitrile and a copolymerized unsaturated monocarboxylic acid. A preferred nitrile rubber is a polymer comprising butadiene and acrylonitrile. When the nitrile rubber is hydrogenated, such as by processes described in U.S. Pat. Nos. 4,464,515, 4,503,196 or 4,631,315, the residual carbon-carbon double bond content is less than 10 mole per cent and preferably less than about 5 mole per cent.

Zinc di-acrylate is a commercially available material. Preferably the zinc di-acrylate contains a scorch retarding additive present in an amount of from about 0.2 to about 5 parts by weight per 100 parts by weight of zinc di-acrylate which is believed, from U.S. Pat. No. 4,857,571, to be a methyl-substituted aminoalkyl phenol and is believed to be 2,6-di-tertiary butyl-4-(dimethylamino) methyl phenol. Alternatively, such a scorch retarding additive may be added to the polymer mixture during the compounding operations at the level of from about 0.2 to about 5, preferably from about 0.3 to about 2, parts by weight per 100 parts by weight of zinc di-acrylate.

Organic peroxides suitable for use in the present invention include those customarily used for curing rubbers and which are well known to those of average skill in the art. Such organic peroxides include dicumyl peroxide, t-butyl-cumyl peroxide, t-butyl perbenzoate, t-butyl peroxide, t-butylperoxy (2-ethyl hexanoate), 2,5-dimethyl-2,5-di(benzoylperoxy)-hexane, benzoyl peroxide, 2,5-dimethyl-2,5-(t-butyl peroxy)-hexane, 1,1-di-tert-butyl peroxy-3,3,5-trimethyl cyclohexane, 4,4-di-tert-butyl peroxy n-butyl valerate and the like.

The load bearing capabilities of the vulcanizates of the present invention are improved over those of the prior art. When zinc di-acrylate is used to prepare the vulcanizates, it has a fast rate of cure and leads to the rapid development of a high modulus as a result of the development of a high crosslink density. When zinc di-methacrylate, as in the prior art, is used to prepare vulcanizates, it has (at the same or similar weight per cent concentration and similar particle size distribution) a slower rate of cure and leads to a slower development of modulus as a result of a slower and lesser development of crosslinks. Hence, the vulcanizates of the present invention have improved load bearing capabilities. The improved abrasion resistance of the vulcanizates of the present inventions over those of the prior art using zinc di-methacrylate also arises due to the high crosslink density achieved. Similarly, the reduced heat build-up, which may be determined directly or through the value of tan $\delta$, of vulcanizates of the present invention can be attributed to the balance of strength properties and crosslink density.

Although vulcanizates of hydrogenated nitrile rubber which have been prepared using zinc di-acrylate or zinc di-methacrylate (of the prior art) have some relatively similar characteristics such as good heat aging properties and good heat resistance, the improved properties of the present vulcanizates are of great significance and can be achieved at lower cost. The improved properties of the present vulcanizates are important in articles such as synchronous and serpentine drive belts, rubber covered rolls and high pressure hoses.

For the vulcanizates of the present invention, the compounds from which they are prepared comprise per 100 parts by weight of hydrogenated nitrile rubber from about 10 to about 85, preferably from about 20 to about 45, parts by weight of zinc di-acrylate and from about 1 to about 10, preferably from about 2 to about 7, parts by weight of organic peroxide based on 100% active peroxide. Preferably the compounds also contain a scorch retarding additive present in an amount of from about 0.2 to about 5, preferably from about 0.3 to about 2, parts by weight per 100 parts by weight of zinc di-acrylate. Such scorch retarding additive, a methyl-substituted aminoalkyl phenol, may be present in the zinc di-acrylate or may be added separately to the compound. The compounds may also contain other conventional compounding ingredients such as fillers including carbon black, silica, talc, clay and the like, plasticizers such as dioctyl sebacate, polyesters and the like, tackifiers and resins, all in quantities well known to those of average skill in the art. Because the presence of zinc di-acrylate leads to the development of high strength, it is not necessary to incorporate fillers and other materials to achieve high strength levels and it is desirable to keep the level of any plasticizer down to a minimum. The compounds are prepared by conventional means using rubber mixing mills or internal mixers, as is well known in the art. The vulcanizates are prepared from the compounds by heating at temperatures from about 140° C. to about 190° C. for times of from about 5 to about 120 minutes.

The following examples illustrate the present invention, with all parts being parts by weight, and all test procedures being ASTM tests except where specified.

EXAMPLE 1

Using a warm (50° C.) two roll rubber mill, the compounds shown in Table I were prepared and then vulcanized by heating for twenty minutes at 180° C. The vulcanizate properties are also shown in Table I. In Table I, the HNBR was TORNAC® C 3845 hydrogenated nitrile rubber (approx. 95% hydrogenation), the amino phenol antioxidant was ETHANOX® 703, the quinoline antioxidant was Agerite Resin D, the mercaptotolylimidazole antioxidant was zinc 2-mercaptotolylimidazole and the dicumyl peroxide was Vulcup 40KE. It is clear that #1 provides properties which are better than Control #1, which is black filled, and shows significantly higher retention of properties on aging. It is also clear that #1 has a faster cure rate and higher load bearing capabilities than Control #2 and also has a higher retention of properties on aging.

TABLE I

| Expt. # | Control 1 | Control 2 | 1 |
|---|---|---|---|
| HNBR | 100 | 100 | 100 |
| Carbon black (N650) | 50 | — | — |

TABLE I-continued

| Expt. # | Control 1 | Control 2 | 1 |
|---|---|---|---|
| Zinc di-methacrylate | — | 40 | — |
| Zinc di-acrylate | — | — | 40 |
| Amino phenol antioxidant | 0.8 | — | — |
| Quinoline antioxidant | 1 | 1 | 1 |
| Mercaptotolylimidazole antioxidant | 1 | 1 | 1 |
| Dicumyl peroxide (40%) | 7 | 5 | 5 |
| Vulcanizate properties | | | |
| Hardness Shore A | 74 | 72 | 73 |
| 100% Modulus (MPa) | 5.4 | 2.8 | 4.7 |
| 300% Modulus (MPa) | 23.0 | 8.6 | 19.4 |
| Tensile Strength (MPa) | 26.2 | 23.7 | 30.6 |
| Elongation (%) | 370 | 495 | 350 |
| Age 168 hours in air at 150° C. | | | |
| Hardness Shore A | 87 | 77 | 78 |
| 100% Modulus (MPa) | — | 12.6 | 6.9 |
| Tensile Strength (MPa) | 7.5 | 18.9 | 23.1 |
| Elongation (%) | 20 | 140 | 260 |

EXAMPLE 2

Further compounds and vulcanizates were prepared according to the procedure of Example 1, according to the details in Table II. The HNBR was TORNAC A 3855 hydrogenated nitrile rubber (approx. 99.5% hydrogenation), ZDMA was zinc dimethacrylate and ZDA was zinc di-acrylate, both of the ZDMA and the ZDA containing a scorch inhibitor, and the peroxide was Perkadox 14-40 which is 40% active bis (t-butyl peroxy) di-isopropyl benzene on a clay filler. Samples of the compound were tested on a Monsanto Rheometer and the results show that the zinc di-acrylate compound (#2) has a faster cure rate (T50-T10) than the control #3 which contains zinc dimethylacrylate and achieves a significantly higher crosslink density (Delta Torque). Further samples were vulcanized for 20 minutes at 180° C. and the data show that the vulcanizates of #2 have a significantly higher load bearing capability than the vulcanizates of control #3.

TABLE II

| Expt. # | Control 3 | 2 |
|---|---|---|
| HNBR | 100 | 100 |
| ZDMA | 35 | — |
| ZDA | — | 35 |
| Peroxide | 5 | 5 |
| Monsanto Rheometer Data - 1° Arc at 180° C. | | |
| T10 (mins.) | 1.1 | 0.6 |
| T50 (mins.) | 2.7 | 1.4 |
| T90 (mins.) | 6.6 | 4.9 |
| T50-T10 (mins.) | 1.6 | 0.8 |
| Max Torque (dNm) | 30 | 63 |
| Delta Torque | 23.4 | 58 |
| Vulcanizate properties | | |
| 100% Modulus (MPa) | 1.8 | 4.5 |
| 200% Modulus (MPa) | 4.3 | 9.9 |
| 300% Modulus (MPa) | 8.1 | 18.9 |
| Tensile Strength (MPa) | 20.7 | 27.7 |
| Elongation (%) | 550 | 385 |

EXAMPLE 3

Using the procedures described in Example 1, further compounds and vulcanizates were prepared and evaluated as shown in Table III. The TORNAC® rubber was that of Example 1 and the ZDMA, ZDA and peroxide were those of Example 2. The data on compression set show that #3 has a significantly lower compression set than that for Control #4. The tan delta data, determined on a rheovibron at 11 Hertz, also shows the reduced heat buildup for #3 compared with that of Control #4.

TABLE III

| Expt. # | Control 4 | 3 |
| --- | --- | --- |
| HNBR | 100 | 100 |
| ZDMA | 40 | — |
| ZDA | — | 40 |
| Peroxide | 5 | 5 |
| Vulcanizate properties - cured 45 minutes at 160° C. | | |
| Compression set, 72 hours at 150° C. (%) | 89.1 | 46.0 |
| Tan delta at 11 HZ | | |
| at 100° C. | 0.112 | 0.085 |
| at 120° C. | 0.099 | 0.076 |
| at 150° C. | 0.090 | 0.067 |

EXAMPLE 4

Further vulcanizates were prepared according to the procedure of Example 1 and evaluated for abrasion resistance, the data being shown in Table IV from which it is clear that #4 has an improved (that is reduced loss) abrasion resistance when compared to Control #5.

TABLE IV

| Expt. # | Control 5 | 4 |
| --- | --- | --- |
| HNBR | 100 | 100 |
| ZDMA | 80 | — |
| ZDA | — | 80 |
| Peroxide | 5 | 5 |
| Vulcanized 20 minutes at 180° C. Abrasion (DIN) (mm³ loss) | 180 | 133 |

EXAMPLE 5

Hydrogenated nitrile rubber was compounded with fumed silica (Cabosil MS7), zinc di-acrylate containing scorch retarder, a silane coupling agent (Silane A174) and a peroxide (Vulcup 40KE) as shown in Table V, cured for twenty minutes at 180° C. and the vulcanizate properties were determined. As can be seen in the Table, vulcanizates having good strength properties, high hardness and good abrasion resistance were obtained with the hydrogenated nitrile rubber which contained about 38 weight per cent of acrylonitrile and which contained less than about 1 mole % residual unsaturation.

TABLE V

| Expt. # | 5 | 6 | 7 | 8 |
| --- | --- | --- | --- | --- |
| HNBR | 100 | 100 | 100 | 100 |
| Silica | 10 | 30 | 10 | 30 |
| Zinc di-acrylate | 20 | 20 | 40 | 40 |
| Silane | 1 | 1 | 1 | 1 |
| Peroxide | 5 | 5 | 5 | 5 |
| Vulcanizate properties | | | | |
| Hardness (Shore A) | 72 | 91 | 84 | 92 |
| 100% Modulus (MPa) | 3.0 | 6.3 | 6.9 | 12.4 |
| 300% Modulus (MPa) | 11.8 | 21.7 | 22.9 | — |
| Tensile Strength (MPa) | 29.2 | 28.5 | 27.4 | 28.5 |
| Elongation (%) | 485 | 395 | 370 | 260 |
| DIN Abrasion (mm³) | 61 | 103 | 85 | 109 |
| Compression Set (age 168 hours at 150° C.) (%) | 52.9 | 69.2 | 72.1 | 77.5 |

What is claimed is:

1. A hydrogenated nitrile rubber based vulcanizate having improved load bearing capabilities, improved abrasion resistance and reduced heat build-up, said vulcanizate having been produced by vulcanization of a compound consisting essentially of 100 parts by weight of hydrogenated nitrile rubber, 10 to 85 parts by weight of zinc di-acrylate and 1 to 10 parts by weight of an organic peroxide based on 100% active peroxide.

2. The vulcanizate of claim 1 wherein the hydrogenated nitrile rubber has less than 10 mole per cent of residual carbon-carbon double bonds.

3. The vulcanizate of claim 1 wherein the compound contains from about 0.2 to about 5 parts by weight per 100 parts by weight of zinc di-acrylate of a scorch retarding additive selected from the methyl-substituted-aminoalkyl phenols.

4. The vulcanizate of claim 3 wherein the scorch retarding additive is 2,6-di-tertiary butyl-4-(dimethylamino) methyl phenol.

5. The vulcanizate of claim 3 wherein the scorch retarding additive was introduced into the compound as an admixture with the zinc di-acrylate.

6. The vulcanizate of claim 3 wherein the hydrogenated nitrile rubber has less than about 5 mole per cent of residual carbon-carbon double bonds.

7. The vulcanizate of claim 2 wherein the hydrogenated nitrile rubber is obtained by the hydrogenation of a nitrile rubber comprising from about 50 to about 85 weight per cent of butadiene and from about 15 to about 50 weight per cent of acrylonitrile.

* * * * *